(12) United States Patent
Sherwood et al.

(10) Patent No.: US 10,173,276 B2
(45) Date of Patent: Jan. 8, 2019

(54) APPARATUS AND METHOD OF PREPARING WIRE ROPE

(71) Applicant: Mazzella Lifting Technologies, Inc., Cleveland, OH (US)

(72) Inventors: Dan Sherwood, Cleveland, OH (US); Matt Mazzella, Strongsville, OH (US)

(73) Assignee: Mazzella Lifting Technologies, Inc., Cleveland, OH (US)

( * ) Notice: Subject to any disclaimer, the term of this patent is extended or adjusted under 35 U.S.C. 154(b) by 0 days.

(21) Appl. No.: 15/713,073

(22) Filed: Sep. 22, 2017

(65) Prior Publication Data

US 2018/0079017 A1 Mar. 22, 2018

Related U.S. Application Data

(60) Provisional application No. 62/398,308, filed on Sep. 22, 2016.

(51) Int. Cl.
| | |
|---|---|
| *B25B 11/00* | (2006.01) |
| *B23D 33/02* | (2006.01) |
| *B23D 23/04* | (2006.01) |
| *B21F 11/00* | (2006.01) |
| *B25B 1/20* | (2006.01) |
| *B25B 1/10* | (2006.01) |
| *B25B 5/00* | (2006.01) |

(Continued)

(52) U.S. Cl.
CPC .............. *B23D 33/02* (2013.01); *B21F 11/00* (2013.01); *B23D 23/04* (2013.01); *B25B 1/103* (2013.01); *B25B 1/20* (2013.01); *B25B 5/003* (2013.01); *B25B 5/006* (2013.01); *B25B 5/10* (2013.01); *B25B 5/147* (2013.01); *B23Q 1/03* (2013.01); *B23Q 3/00* (2013.01); *B25B 11/00* (2013.01)

(58) Field of Classification Search
USPC ............ 248/121, 122.1, 124.1, 124.2, 125.2, 248/125.3; 269/1, 2, 5, 6, 42, 60, 61, 91, 269/136, 165, 178, 216, 219, 222, 55, 73; 29/281.1
See application file for complete search history.

(56) References Cited

U.S. PATENT DOCUMENTS 1,812,585 A * 6/1931 Collins ................ B25H 1/0007
248/172
2,176,215 A * 10/1939 Falge ................... G01M 11/061
104/242

(Continued)

FOREIGN PATENT DOCUMENTS

GB 221902 A * 9/1924 ........... H01F 27/004

*Primary Examiner* — Alfred J Wujciak
(74) *Attorney, Agent, or Firm* — Emerson Thomson Bennett; Roger D. Emerson; Nicholas J. Bagnolo

(57) ABSTRACT

Provided is an apparatus for preparing wire rope having a stand; a first cross-member; a second cross-member; a first clamp arm; a second clamp arm; a first clamp; a second clamp; an adjustment wheel; an adjustment screw; and an adjustment gear; wherein the second cross-member is at least partially contained within the first cross-member; wherein the first clamp is disposed at the distal end of the first clamp arm, the second clamp is disposed at the distal end of the second clamp arm, and wherein the first and second clamp arm are spaced from each other; and wherein the distance between the first and second clamp arm is adjustable. Also provided is a method of use for the same.

15 Claims, 3 Drawing Sheets

(51) Int. Cl.
  *B25B 5/10*    (2006.01)
  *B25B 5/14*    (2006.01)
  *B23Q 3/00*    (2006.01)
  *B23Q 1/03*    (2006.01)

(56) References Cited

U.S. PATENT DOCUMENTS

| | | | | | |
|---|---|---|---|---|---|
| 2,599,269 | A | * | 6/1952 | Markle | F16M 11/10 |
| | | | | | 248/404 |
| 2,827,690 | A | * | 3/1958 | Brown | B25H 1/0007 |
| | | | | | 269/17 |
| 3,221,607 | A | * | 12/1965 | Larsson | B23G 1/32 |
| | | | | | 409/76 |
| 3,504,715 | A | * | 4/1970 | Miles | B27B 7/00 |
| | | | | | 83/489 |
| 3,522,651 | A | * | 8/1970 | Lacey | C03B 23/02 |
| | | | | | 219/203 |
| 7,093,809 | B2 | * | 8/2006 | Hwang | B25H 1/0007 |
| | | | | | 248/127 |
| 2006/0113435 | A1 | * | 6/2006 | Nikolic | B25H 1/0007 |
| | | | | | 248/122.1 |

* cited by examiner

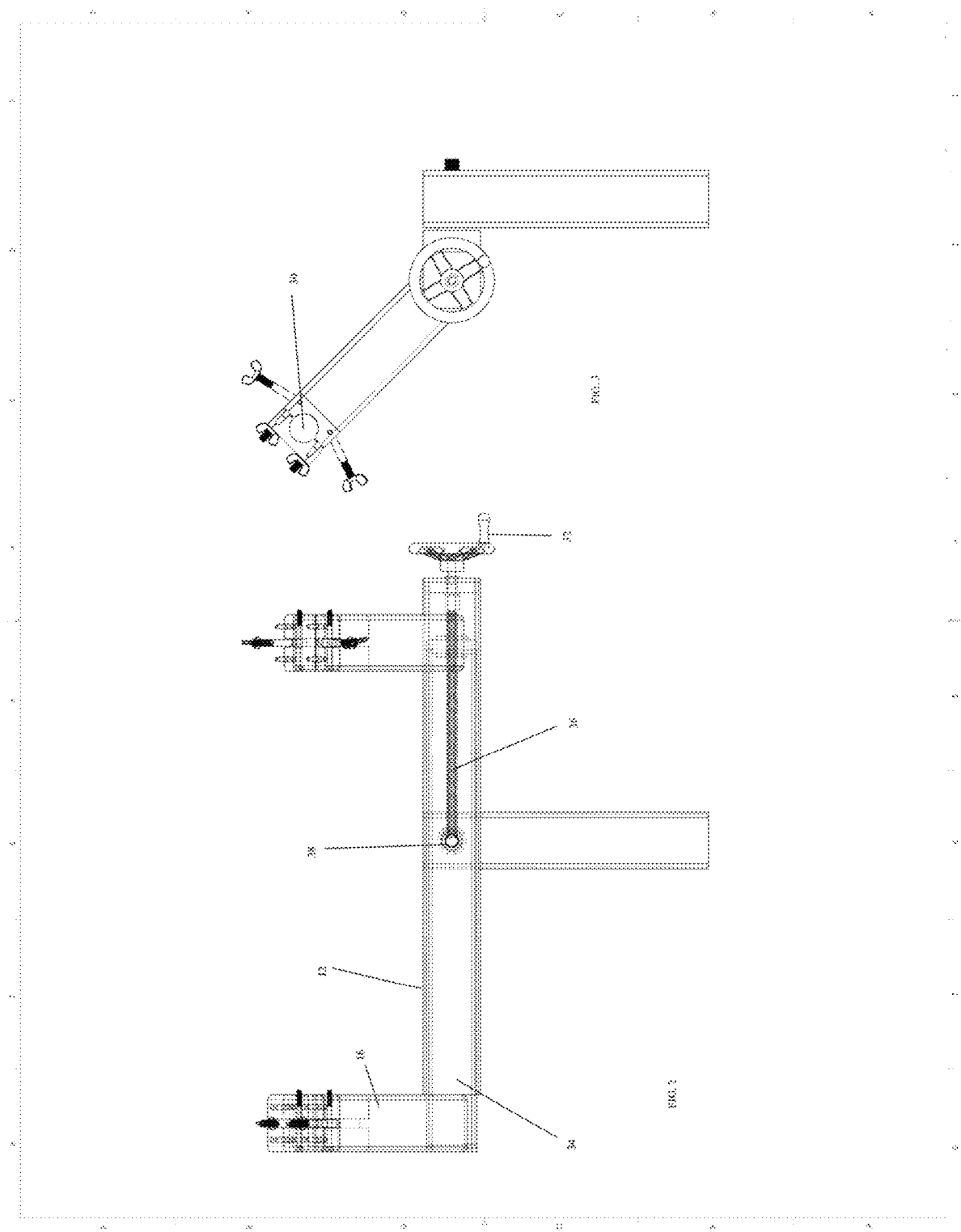

APPARATUS AND METHOD OF PREPARING WIRE ROPE

This application claims the benefit of Provisional Application No. 62/398,308 which was filed on Sep. 22, 2016 and is incorporated by reference as if fully rewritten herein.

TECHNICAL FIELD

This application relates generally to an apparatus and method for preparing wire rope. In particular, this apparatus is a stand and clamp assembly for use in cutting wire rope and installing wire rope fittings.

BACKGROUND

Wire rope is in actuality a complex machine consisting of multiple wires bundled into strand which are wound around a central core. A typical 6×25 rope has 150 wires in each strand. Each wire can move independently and in cooperation with the other wires in the strand, and each strand can move independently and in cooperation with other strands to allow the wire rope to bend and flex as needed given the desired application.

Uses of wire rope vary, and can include applications in the steel industry, construction industry, mining industry, automotive industry, oil and gas industry, or any other industry where loads are lifted, moved, or secured. Depending on the industry and desired application, the length, diameter, strength, and connection type can vary widely. Thus, wire rope is often manufactured in varying diameters and strengths, but in long lengths which are later cut to size and the appropriate fittings are attached once the application for the wire rope is known.

Current solutions for cutting wire rope and attaching fittings include the use or bench vises, clamps, and/or hand tools. These methods are time consuming, do not always yield consistent results, and can compromise the integrity of the wire rope and/or the attached fitting. Other methods include permanent installations which allow for consistent results, but are large, unwieldly, and expensive. What is needed is a tool which can allow for quick and consistent results without compromising consistency and integrity of the wire rope.

SUMMARY

Provided is an apparatus for preparing wire rope having a stand; a first cross-member; a second cross-member; a first clamp arm; a second clamp arm; a first clamp; a second clamp; an adjustment wheel; an adjustment screw; and an adjustment gear; wherein the second cross-member is at least partially contained within the first cross-member; wherein the first clamp is disposed at the distal end of the first clamp arm, the second clamp is disposed at the distal end of the second clamp arm, and wherein the first and second clamp arm are spaced from each other; and wherein the distance between the first and second clamp arm is adjustable.

Also provided is a method of use of the apparatus for preparing wire rope consisting of the steps of: (a) Providing an apparatus having: a stand; a first cross-member; a second cross-member; a first clamp arm; a second clamp arm; a first clamp; a second clamp; an adjustment wheel; an adjustment screw; and an adjustment gear; and an extension configured to hold a wire rope fitting; wherein the second cross-member is at least partially contained within the first cross-member; wherein the first clamp is disposed at the distal end of the first clamp arm, the second clamp is disposed at the distal end of the second clamp arm, and wherein the first and second clamp arm are spaced from each other; wherein the distance between the first and second clamp arm is adjustable; and, wherein the both the first and second clamps further comprise a base, a cover, a central bore, at least one alignment pin and at least one clamp fastener; (b) Opening the first and second clamp by removing the cover from the base; (c) Placing a length of wire rope in the central bore of the first and second clamp; (d) Replacing the cover on the base and securing the wire rope within the first and second clamps; (e) Turning the adjustment wheel to place tension on the wire rope; (f) Seizing and cutting the wire rope; (g) Grooming the wire rope; (h) Placing a fitting in the extension and installing the fitting over an end of the wire rope; (i) Turning the adjustment wheel to pull the fitting into place; (j) Fixing the fitting to the wire rope; and (k) Removing the wire rope from the clamps.

DESCRIPTION OF THE DRAWINGS

FIG. 2 is a frontal, cross-sectional view, of the device showing internal features and structures;

FIG. 3 is a side view of the device; and

DETAILED DESCRIPTION

Figure 1:
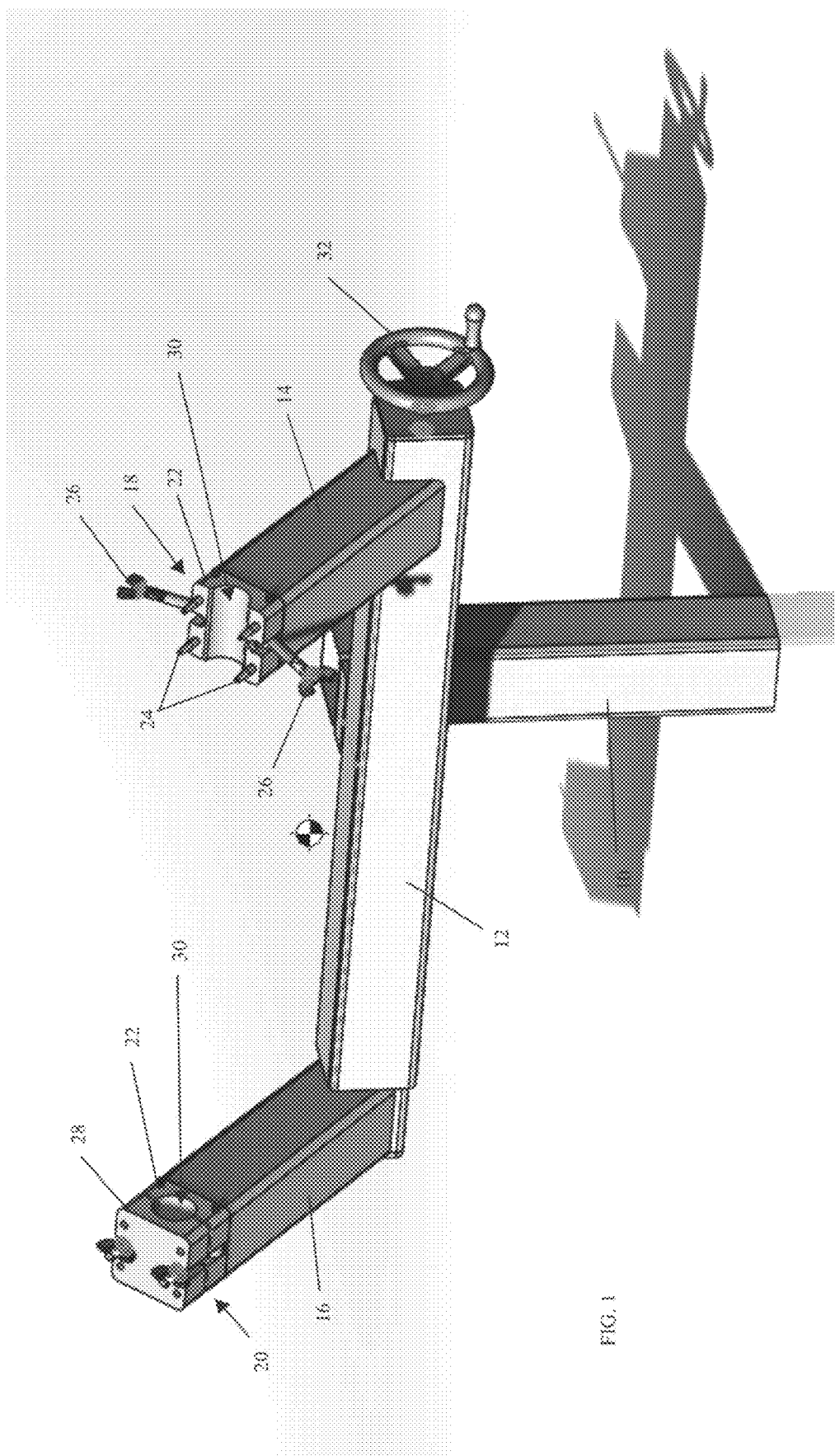
FIG. 1 is perspective view of an embodiment of the device herein.

With reference to FIG. 1, an apparatus for use in cutting wire rope and installing wire rope fittings is shown. The apparatus is, in its most basic terminology, a portable wire rope clamp stand with an expanding length. The clamp stand includes a base 10, an external cross-member 12, a first clamp arm 14 fixed to the external cross-member 12, and a second clamp arm 16, separate from the first arm 14, the second arm 16 not fixed to the external cross-member 12 (the attachment of the second arm 16 is discussed in more detail with regards to FIG. 2 below). The first clamp arm 14 has a first clamp 18 disposed at the distal end, and the second clamp arm has a second clamp 20 disposed at the distal end. Each of the first and second clamps 18, 20, consist of a bottom portion, or base, 22 which can be removably attached to the distal end of the respective clamp arms 14, 16. The base 22 includes at least one alignment pin 24, and at least one clamp fastener 26. The first and second clamps 18, 20, also include a top portion, or cover 28 which can have holes that correspond to the alignment pins 24 to assist in proper placement of the cover 28 on the first or second clamps 18, 20. When aligned and placed on the base 22 portion of the clamps 18, 20, the clamp fastener 28 is engaged to secure the cover 28 in place. The base 22 and cover 28 each include a recessed area extending the full width of the clamp that further defines a channel, or central bore 30 which can receive the wire rope. The clamp stand further includes an adjustment wheel 32 which can be used to expand the distance between the first arm 14 and the second arm 16.

With reference to FIG. 2, a cross-sectional view of the device is shown from a frontal position. Enclosed within the external cross-member 12 is an internal cross member 34. Contained therein is a standard adjustment screw 36 and gear 38 that allows the internal cross-member 34 to travel side-to-side within the external cross-member 12 when the adjustment wheel 32 is turned. The end of the internal cross-member 34 disposed opposite the adjustment wheel 32 extends beyond the end of the external cross-member 12 to allow for the fixed attachment of the second arm 16 to the internal cross-member 34. Thus, the side-to-side travel of the internal cross-member 34 relative to the external cross-member 12 causes the distance between the first arm 14 and second arm 16 to change according to the distance and direction travelled by the internal cross-member 34.

With reference to FIG. 3, a side view of the device is shown wherein it can be seen that the central bore 30 extends through the first and second clamps 18, 20, with no obstructions.

Figure 4:
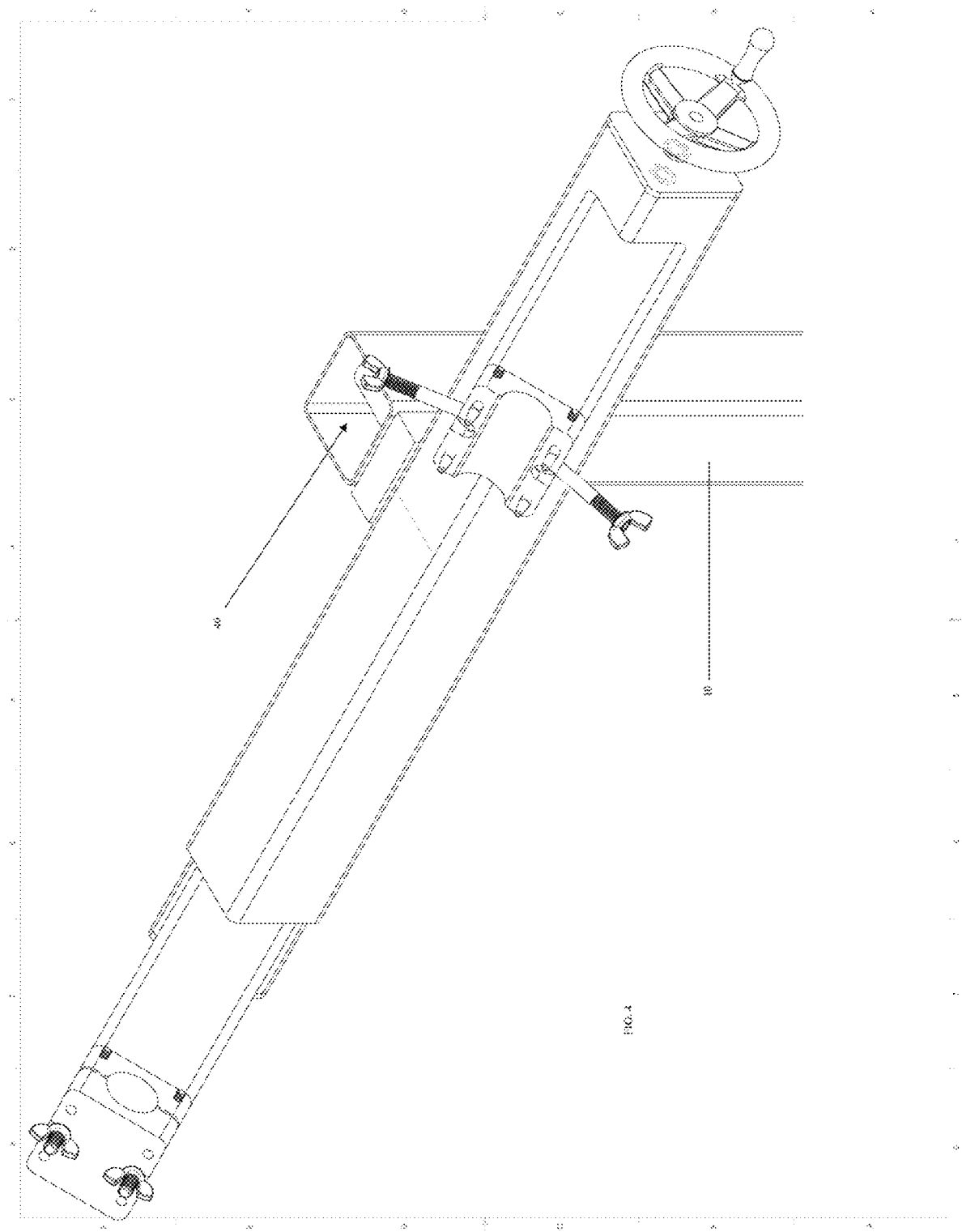
FIG. 4 is a second perspective view of the disclosed device.

Having thus described the apparatus, we now turn to the manner in which the apparatus is operated. As seen in FIG. 4, the base 10 can consist of a squared hollow tube 40, with an opening at either end. This can allow the device to be quickly attached to and/or detached from a number of other structures to secure it while in operation. The means for attachment can include, but is not limited to, sliding the tube 40 over a second structure which is secured to a vehicle, building, floor, or other stable support, bolting the tube 40 to such a structure, or any other attachment means selected by a person of skill in the art that is appropriate for the desired application.

According to one aspect, the portable device can be secured to a truck body or crane body.

To use the device, an operator first must determine the needed circumference of wire rope and adjust the clamps 18, 20 accordingly. It is important that the clamps 18, 20 can hold the wire rope securely without slipping, therefore it is contemplated that the base 22 and cover 28 of the clamps 18, 20 are removable from the first and second arms 14, 16, and can be interchangeable with like parts having a different diameter central bore 30. According to another aspect, the central bore 30 can include an adapter which can allow the diameter of the central bore 30 to be changed as desired. The size of the central bore 30 is easily selected by a person of skill in the art depending on the circumference of the wire rope being used.

Once the operator has selected the proper sized clamps 18, 20, and central bore, the operator removes the cover 28 from the base 22 of the clamps 18, 20 and places a length of wire rope within the central bore 30. The operator then replaces the cover 28, using the alignment pins 24 and clamp fastener 26 to securely lock the cover 28 in place. According to one aspect (as depicted in the figures), the clamp fastener 26 can consist of a pair bolts which are pivotally attached to the base 22 and fit into corresponding grooves in the cover 28 which is then secured by rotating the bolts upwards and fastening the cover with wing nuts. Other aspects of clamp fastener 26 can include removable bolts, screws, nails, or other fasteners chosen by a person of skill in the art. Having the cover 28 now fastened in place atop the base 22, the wire rope is secured within the central bore 30. The operator then turns the adjustment wheel 32 to extend the internal cross-member 34 to move the second arm 16 away from the first arm 14 thereby placing tension in the wire rope.

With the wire rope secured and under tension, the operator can now place seizing throughout the rope according to known processes and at locations chosen within sound discretion of the operator dependent upon the desired application. Once the wire rope is properly seized, the operator cuts the rope at a predetermined spot and removes one end of the rope from one of the clamps by removing the cover 28 from the base 22. The wire rope is likewise released from the other clamp and the end is pulled through to again extend between both clamps 18, 20. The cover 28 is replaced on the base 22, again securing the wire rope, and the adjustment wheel 32 can be turned to place the rope under tension once more, if desired.

The next step in the process involves the operator grooming the rope according to the desired application. The manner of grooming can be chosen by a person of skill in the art accordingly. Once the rope is groomed, the operator installs the desired fitting on the end of the wire rope.

According to one aspect, the disclosed device can include an extension to the first arm 14 or second arm 16 that includes an extension (not shown in the Figures) to hold the desired fitting in place in line with the central bore 30. It is contemplated that this optional extension can be interchangeable to allow for inclusion of differing types and/or sizes of fittings. According to this aspect, once the fitting is placed on the end of the rope and held by the extension, the operator turns the adjustment wheel 32 to pull the fitting on to the end of the rope. Once the desired fitting is in place, the operator applies resin to the fitting to lock the fitting to the wire rope and providing the industry standard 100% efficiency on the rope and fitting. Once the resin has dried, the operator releases the clamps 18, 20 by removing the cover 28 from the base 22 and removes the wire rope.

According to one aspect, the extension can attach to the external 12 or internal 34 cross-member and extend therefrom to a position in line with the central bore 30.

According to one aspect, the fitting can include buttons, threaded fittings, eyes, forks, sockets, or any other type of fitting chosen for the application by a person of skill in the art.

According to one aspect, the adjustment wheel 32 can consist of a socket and adapter that can be driven by a ratchet, an air ratchet, a wrench, or another similar tool.

According to one aspect, the base 10 can be permanently attached to another surface thereby making the disclosed device a permanent fixture, for example, in a maintenance or manufacturing capacity.

As described above, the present disclosure has been described with preferred embodiments thereof and it is understood that many changes and modifications to the described embodiments can be carried out without departing from the scope and the spirit of the present disclosure that is intended to be limited only by the appended claims.

We claim:

1. An apparatus for preparing wire rope comprising:
   a stand;
   a first cross-member;
   a second cross-member;
   a first clamp arm;
   a second clamp arm;
   a first clamp;
   a second clamp;
   an adjustment wheel;
   an adjustment screw; and
   an adjustment gear;
   wherein the second cross-member is at least partially contained within the first cross-member;
   wherein the first clamp is disposed at the distal end of the first clamp arm for retaining the wire rope and wherein the first clamp arm is mounted on the first cross member and the second clamp is disposed at the distal end of the second clamp arm for retaining the wire rope and wherein the second clamp arm is mounted on the second cross member, and wherein the first and second clamp arm are spaced from each other; and wherein the distance between the first and second clamp arm is adjustable wherein both of the first clamp and the second clamp further comprises a base, a cover and a central bore, wherein the central bore is in between the base and cover, at least one alignment pin and at least one clamp fastener and wherein the central bore of at least one of the first clamp and the second clamp incudes an adapter to change the circumference of the central bore.

2. The apparatus of claim 1 wherein the central bore of the first clamp includes an adapter to change the circumference of the central bore.

3. The apparatus of claim 1 wherein the central bore of the second clamp includes an adapter to change the circumference of the central bore.

4. The apparatus of claim 1 wherein the central bore of the first clamp and the central bore of the second clamp includes an adapter to change the circumference of the central bore.

5. The apparatus of claim 4 further comprising an extension configured to hold a wire rope fitting.

6. The apparatus of claim 5 wherein the extension further comprises an interchangeable extension configured to adapt to a plurality of fittings.

7. The apparatus of claim 6 wherein the extension is attached to the first cross member or the second cross member and extends therefrom to a position in line with the central bore.

8. The apparatus of claim 5, wherein the wire rope fitting is selected from the group consisting of buttons, treaded fittings, eyes, forks and sockets.

9. The apparatus of claim 1 further comprising an extension configured to hold a wire rope fitting.

10. The apparatus of claim 9 wherein the extension further comprises an interchangeable extension configured to adapt to a plurality of fittings.

11. The apparatus of claim 1, wherein the adjustment wheel comprises a socket and an adapter that is driven by a ratchet, an air ratchet or a wrench.

12. The apparatus of claim 1, wherein the stand is permanently attached to a surface rendering the apparatus a permanent fixture.

13. A method of preparing wire rope comprising the steps of:
a. Providing an apparatus comprising:
a stand;
a first cross-member;
a second cross-member;
a first clamp arm;
a second clamp arm;
a first clamp;
a second clamp;
an adjustment wheel;
an adjustment screw;
an adjustment gear; and
an extension configured to hold a wire rope fitting;
wherein the second cross-member is at least partially contained within the first cross-member;
wherein the first clamp is disposed at the distal end of the first clamp arm and wherein the first clamp arm is mounted on the first cross member and the second clamp is disposed at the distal end of the second clamp arm and wherein the second clamp arm is mounted on the second cross member, and wherein the first and second clamp arm are spaced from each other;
wherein the distance between the first and second clamp arm is adjustable; and,
wherein the both the first and second clamps further comprise a base, a cover, a central bore, at least one alignment pin and at least one clamp fastener;
b. Opening the first and second clamp by removing the cover from the base;
c. Placing a length of wire rope in the central bore of the first and second clamp;
d. Replacing the cover on the base and securing the wire rope within the first and second clamps;
e. Turning the adjustment wheel to place tension on the wire rope;
f. Seizing and cutting the wire rope;
g. Grooming the wire rope;
h. Placing a fitting in the extension and installing the fitting over an end of the wire rope;
l. Turning the adjustment wheel to pull the fitting into place;
J. Fixing the fitting to the wire rope; and
k. Removing the wire rope from the clamps.

14. The method of claim 13 wherein the extension further comprises an interchangeable extension configured to adapt to a plurality of fittings.

15. The method of claim 14 wherein the central bore includes an adapter to change the circumference of the central bore.

* * * * *